(12) United States Patent
Miyazaki

(10) Patent No.: US 10,362,207 B2
(45) Date of Patent: Jul. 23, 2019

(54) IMAGE CAPTURING APPARATUS CAPABLE OF INTERMITTENT IMAGE CAPTURING, AND CONTROL METHOD AND STORAGE MEDIUM THEREOF

(71) Applicant: CANON KABUSHIKI KAISHA, Tokyo (JP)

(72) Inventor: Yasuyoshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 15/628,113

(22) Filed: Jun. 20, 2017

(65) Prior Publication Data

US 2017/0374254 A1    Dec. 28, 2017

(30) Foreign Application Priority Data

Jun. 24, 2016    (JP) .................. 2016-125916

(51) Int. Cl.
*H04N 5/232* (2006.01)
*H04N 5/235* (2006.01)

(52) U.S. Cl.
CPC .......... *H04N 5/232* (2013.01); *H04N 5/2352* (2013.01); *H04N 5/2353* (2013.01); *H04N 5/23219* (2013.01); *H04N 5/23254* (2013.01)

(58) Field of Classification Search
CPC .... H04N 5/232; H04N 5/2353; H04N 5/2352; H04N 5/23219; H04N 5/23254
See application file for complete search history.

(56) References Cited

U.S. PATENT DOCUMENTS

| 2014/0176789 A1* | 6/2014 | Kubota | H04N 5/23219 348/362 |
| 2014/0198234 A1* | 7/2014 | Kobayashi | H04N 1/2129 348/231.99 |
| 2015/0043893 A1* | 2/2015 | Nishizaka | G11B 27/005 386/278 |
| 2015/0086176 A1* | 3/2015 | Komiya | H04N 5/2353 386/226 |

FOREIGN PATENT DOCUMENTS

| JP | 2002-218309 A | 8/2002 |
| JP | 2013-062740 A | 4/2013 |

* cited by examiner

*Primary Examiner* — Mekonnen D Dagnew
(74) *Attorney, Agent, or Firm* — Cowan, Liebowitz & Latman, P.C.

(57) ABSTRACT

An image capturing apparatus capable of performing intermittent image capturing at a predetermined time interval, the image capturing apparatus comprises: an acquisition unit configured to acquire a feature amount of image data obtainable from an image capturing unit; and a setting unit configured to set the predetermined time interval according to a scene based on the feature amount; wherein the feature amount is information related to at least one of luminance of the image data, object distance to an object, a detection result of an object, and movement of an object.

18 Claims, 11 Drawing Sheets

DAYTIME

NIGHT SCENE

STARRY SKY

NEAR PERSON

FAR PERSON

MACRO OBJECT
MOVEMENT OBSERVATION

MACRO STATIONARY OBJECT
FIXED POINT OBSERVATION

FIG. 6A

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

FIG. 6B

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

FIG. 6C

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

FIG. 6D

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

FIG. 6E

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

FIG. 6F

|   | 0 | 1 | 2 | 3 | 4 | 5 | 6 | 7 | 8 | 9 | 10 | 11 | 12 |
|---|---|---|---|---|---|---|---|---|---|---|----|----|----|
| 0 | 8 | 8 | 8 | 8 | 8 | 8 | 8 | 8 | 1 | 8 | 8  | 1  | 8  |
| 1 | 8 | 8 | 8 | 8 | 8 | 8 | 1 | 1 | 1 | 8 | 8  | 1  | 8  |
| 2 | 8 | 8 | 8 | 8 | 8 | 8 | 8 | 8 | 8 | 8 | 8  | 8  | 8  |
| 3 | 8 | 8 | 8 | 8 | 8 | 8 | 8 | 8 | 8 | 8 | 2  | 2  | 2  |
| 4 | 8 | 8 | 8 | 8 | 8 | 8 | 2 | 2 | 2 | 2 | 2  | 2  | 2  |

MACRO OBJECT
MOVEMENT OBSERVATION

MACRO STATIONARY OBJECT
FIXED POINT OBSERVATION

FLOW OF TIME

FLOW OF TIME

IMAGE CAPTURING APPARATUS CAPABLE OF INTERMITTENT IMAGE CAPTURING, AND CONTROL METHOD AND STORAGE MEDIUM THEREOF

BACKGROUND OF THE INVENTION

Field of the Invention

The present invention relates to an image capturing apparatus capable of intermittent image capturing, and a control method and a storage medium of that image capturing apparatus.

Description of the Related Art

Conventionally, a so-called time lapse moving image is known in which intermittent image capturing is performed at a predetermined time interval, and a plurality of acquired images are each recorded in separate image files or are recorded in one file. Japanese Patent Laid-Open No. 2013-62740 proposes an image capturing apparatus configured to generate a composite image obtained by compositing a plurality of still images that were captured intermittently, and a moving image. When playing back data of a plurality of still images that were captured intermittently as a moving image, it is possible to try shortening in time a slow movement that cannot be seen in the normal progress of time. However, if a shooting interval appropriate for the shooting situation has not been set, there become many redundant images or insufficient images, and as a result an unnatural moving image unintended by the user is acquired.

On the other hand, Japanese Patent Laid-Open No. 2002-218309 proposes technology in which image capturing is performed intermittently while dynamically changing the shooting interval in consideration of differences between consecutive images.

However, in the technology proposed in Japanese Patent Laid-Open No. 2002-218309, there are cases where an appropriate shooting interval cannot be set when the difference between consecutive images becomes large. The reason for this is that, even among cases where the difference between images becomes large, such as when shooting cloud movement of a landscape or a flow of people, the appropriate shooting interval differs depending on the scene, such as in scenes where the appropriate shooting interval is comparatively long.

On the other hand, for a user who is not familiar with time lapse shooting, it is not easy to set an appropriate shooting interval for each scene, and in some cases the desired shooting result cannot be obtained even if the user spends a long time shooting.

SUMMARY OF THE INVENTION

The present invention has been made in consideration of the aforementioned problems, and realizes technology that, in intermittent image capturing, is capable of facilitating setting of an image capturing interval appropriate for a scene.

In order to solve the aforementioned problems, one aspect of the present invention provides an image capturing apparatus capable of performing intermittent image capturing at a predetermined time interval, the image capturing apparatus comprising: an acquisition unit configured to acquire a feature amount of image data obtainable from an image capturing unit; and a setting unit configured to set the predetermined time interval according to a scene based on the feature amount; wherein the feature amount is information related to at least one of luminance of the image data, object distance to an object, a detection result of an object, and movement of an object.

Another aspect of the present invention provides, a control method of an image capturing apparatus capable of performing intermittent image capturing at a predetermined time interval, the method comprising: acquiring a feature amount of image data obtainable from an image capturing unit; and setting the predetermined time interval according to a scene based on the feature amount; wherein the feature amount is information related to at least one of luminance of the image data, object distance to an object, a detection result of an object, and movement of an object.

Still another aspect of the present invention provides, a non-transitory computer-readable storage medium storing a program for causing a computer to execute a control method of an image capturing apparatus capable of performing intermittent image capturing at a predetermined time interval, the method comprising: acquiring a feature amount of image data obtainable from an image capturing unit; and setting the predetermined time interval according to a scene based on the feature amount; wherein the feature amount is information related to at least one of luminance of the image data, object distance to an object, a detection result of an object, and movement of an object.

According to the present invention, in intermittent image capturing, it is possible to facilitate setting of an image capturing interval appropriate for a scene.

Further features of the present invention will become apparent from the following description of exemplary embodiments (with reference to the attached drawings).

BRIEF DESCRIPTION OF THE DRAWINGS

FIGS. 6A to 6F show an example of a method of determining object regions according to the present embodiment.

DESCRIPTION OF THE EMBODIMENTS

Following is a detailed description of an exemplary embodiment of the present invention with reference to the accompanying drawings. Note that in the following description, interval shooting for acquiring an image corresponding to each frame constituting a time lapse moving image will be described as intermittent image capturing. Also, the time lapse moving image is described as a moving image acquired by joining together in time series data of a plurality of images that are consecutive in time and were acquired by intermittent image capturing. Below, an example using an arbitrary digital camera capable of intermittent image capturing will be described as one example of an image capturing apparatus. However, the present embodiment is not limited to a digital camera, and is applicable also to arbitrary electronic devices capable of intermittent image capturing. These devices may include, for example, personal computers, mobile telephones including smartphones, game machines, tablet terminals, clock-type or eyeglasses-type information terminals, medical devices, surveillance cameras, in-vehicle cameras, and the like.

Configuration of Digital Camera 100

Figure 1:
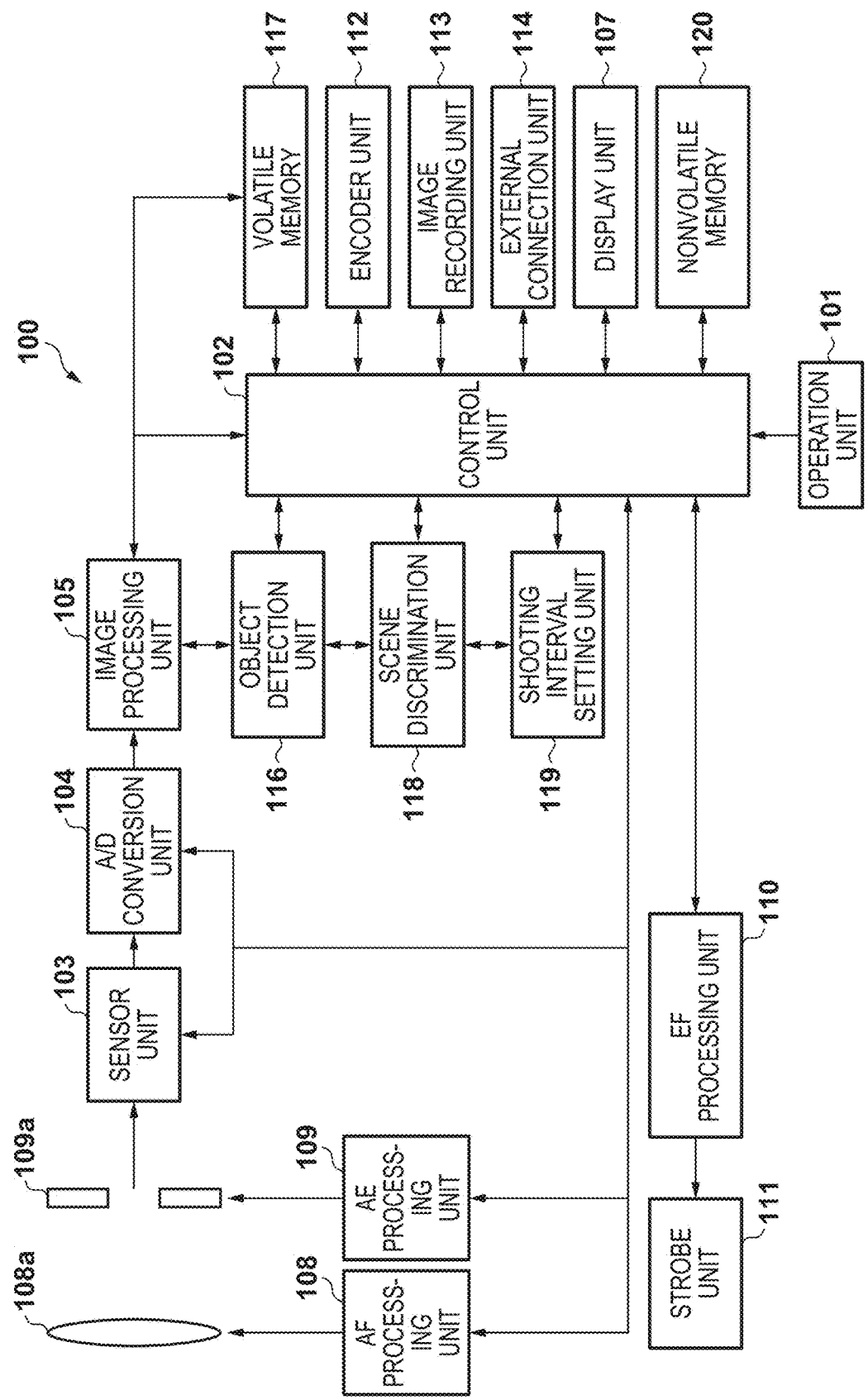
FIG. 1 is a block diagram showing an exemplary functional configuration of a digital camera serving as one example of an image capturing apparatus according to an embodiment of the present invention.

FIG. 1 is a block diagram showing an exemplary functional configuration of a digital camera 100 serving as one example of an image capturing apparatus of the present embodiment. Note that one or more of the functional blocks shown in FIG. 1 may also be realized with hardware such as an ASIC or a programmable logic array (PLA), or may be realized by a programmable processor such as a CPU or an MPU executing software. Also, a functional block may be realized by a combination of software and hardware. Therefore, in the following description, even in a case where different functional blocks are described as an actor performing an operation, the functional blocks can be realized with the same hardware as the actor.

An operation unit 101 is configured with a switch, a button, a dial, or the like operated by the user to input various instructions to the digital camera 100. For example, the operation unit 101 includes a shutter switch, and a touch sensor (a component that can be operated by the user touching a display apparatus). When an instruction is input by the user, the operation unit 101 outputs information related to operation to a control unit 102.

The control unit 102 includes a CPU (MPU), and by opening a program stored in a nonvolatile memory 120 in a volatile memory 117 and executing the program, controls the overall operation of the digital camera 100 and controls data transfer between respective blocks. Also, each unit is controlled according to instructions from the operation unit 101. The volatile memory 117 includes, for example, a volatile memory such as an SDRAM, and stores various data such as image data or audio data output from an image processing unit 105, data necessary for processing by the control unit 102, and the like.

A sensor unit 103 includes a configuration in which a plurality of pixels each having a photoelectric conversion element are arranged in two dimensions. Light incident through a lens 108a and a mechanical mechanism 109a is photoelectrically converted by each pixel, and an electrical charge corresponding to the amount of that light is outputted as an analog image signal. The sensor unit 103 may be, for example, a CCD (Charge-Coupled Device) image sensor or a CMOS (Complementary Metal Oxide Semiconductor) image sensor. An A/D conversion unit 104 performs processing such as, for example, sampling, gain adjustment, A/D conversion or the like on the analog image signal that was output from the sensor unit 103, and then outputs a digital image signal.

The image processing unit 105 performs various image processing such as color signal conversion and development processing on the digital image signal that was output from the A/D conversion unit 104, and then outputs the processed digital image signal. For example, an RGB-format digital image signal received from the A/D conversion unit 104 is converted into a YUV image signal (image data) and then outputted. Also, the image processing unit 105 combines data of a plurality of images acquired by intermittently performing image capturing of an object in the order of acquisition (shooting order) to generate a time lapse moving image. Note that a time lapse moving image is a moving image in which the acquisition interval between images corresponding to each frame constituting the moving image is longer than in a normal moving image. In the present embodiment, one second is used as a minimum value for the image capturing interval of intermittent image capturing for acquiring a time lapse moving image, but a configuration may also be adopted in which an image capturing interval less than one second can be set. Commonly, in a case of acquiring both a normal moving image and a time lapse moving image, a moving image playback time relative to the image capturing time is shorter for the time lapse moving image than for the normal moving image.

A display unit 107 includes a display device such as, for example, a liquid crystal display, an organic EL display, an electronic paper, or the like, and displays an image that was shot or an image that was read out from an image recording unit 113. Also, the display unit 107 displays a menu screen for the user to operate the digital camera 100.

An AF processing unit 108 evaluates an in-focus state using the image data that was output from the image processing unit 105, and controls the position of a focus lens included in the lens 108a based on the evaluation result, thereby focusing an optical image to be formed on the sensor unit 103. As the method of evaluating the in-focus state, for example, a position with a highest evaluation value related to contrast of image data is detected, and evaluation is performed using so-called contrast AF that executes AF processing based on the result of that detection. Also, if a configuration is adopted in which the sensor unit 103 includes phase difference detection pixels that are separate from image capturing pixels, or are used also as image capturing pixels, the in-focus state may also be evaluated by executing the AF processing based on the output of the phase difference detection pixels. The method of the AF processing is not limited to the method described above, and any method may be adopted as long as the method is well known. An AE processing unit 109 calculates a differential between luminance obtained from the image data that was output from the image processing unit 105 and appropriate luminance, and controls operation of an aperture included in the mechanical mechanism 109a based on the differential, thereby appropriately setting the amount of light incident on the sensor unit 103. Note that information regarding the appropriate luminance is assumed to be stored in advance in the nonvolatile memory 120, described later.

When a judgment to emit light has been performed by the control unit 102, an EF (Electronic Flash) processing unit 110 causes a strobe unit 111, which is a light emission apparatus, to emit an amount of light that allows brightness of an object to be appropriate. An encoder unit 112 converts the format of the image data that was outputted from the image processing unit 105 into a predetermined format such as JPEG, and then outputs the converted image data to the image recording unit 113. The image recording unit 113 includes a recording medium such as a nonvolatile memory, and records image data of the predetermined format that was inputted from the encoder unit 112. Also, when adopting a configuration in which the recording medium can be detached, the image data may be stored in an external memory that has been inserted into the digital camera 100. Also, if necessary, the image data that was inputted from the encoder unit 112 may be temporarily stored in the volatile memory 117. An external connection unit 114 includes, for example, a communications circuit and a communications module, and is connected to an external device by wired communications or wireless communications, and transmits/ receives image data and control signals.

An object detection unit 116 detects an object in a screen corresponding to the image data based on the image data, and outputs object information related to the object detection result. Note that in the example of the present embodiment, the object detection unit 116 preferentially detects a person as a detection target, and when a person is not included in the screen or when the person is small, the object detection unit 116 performs region division within the screen and detects a main object. In a scene discrimination unit 118, a scene of the shot image is determined based on the degree of various features (feature amount) in the acquired image data, such as object information obtained from the image processing unit 105 and the object detection unit 116, object distance information in the screen, brightness information, movement information in the screen, and the like. Note that in the present embodiment, the feature amount of image data used for scene discrimination includes at least one type of information among information regarding luminance of the image data, information regarding the distance (object distance) from, for example, the image capturing plane of the digital camera 100 to the object, information regarding detection results of the object in the image data, and information regarding movement of the object in the image data. In a shooting interval setting unit 119, according to the scene determined by the scene discrimination unit 118, a shooting interval when performing intermittent image capturing of the object is set. The nonvolatile memory 120 is configured with a semiconductor memory, a magnetic disk, or the like, and stores a program for the CPU in the control unit 102, constants for operation, and the like.

Series of Operations Related to Intermittent Image Capturing

Next, with reference to FIGS. 2A and 2B, a series of operations related to intermittent image capturing will be described. In this processing, a feature amount is acquired from image data before starting this shooting. Based on the acquired feature amount, each scene described later with reference to FIGS. 3A to 3G is distinguished, and a shooting interval appropriate for the scene is set. Then, intermittent image capturing is performed with the set shooting interval to acquire data of a plurality of images for a time lapse moving image. Note that this processing is started in a case where, for example, the user pressed a power switch included in the operation unit 101 and thus the control unit 102 supplied power to each unit constituting the digital camera 100. Also, this processing is realized by the control unit 102 opening a program stored in an unshown ROM in a work area of the volatile memory 117 and executing the program, and also controlling each unit, such as the object detection unit 116.

In step S201, the operation unit 101 sets a period during which to execute intermittent image capturing according to an instruction of the control unit 102. In this step, a total shooting time of executing intermittent image capturing is set, rather than an acquisition interval of image data used to generate a time lapse moving image, such as 1 second, 30 seconds, 1 hour, or 10 hours. Note that in this example, shooting is finally ended by setting the total shooting time, but depending on the setting, the total shooting time may be unlimited, or shooting may be ended at a time desired by the user. Also, a configuration may be adopted in which a total number of image capturing times to perform intermittent image capturing is set rather than a total shooting time.

In step S202, the control unit 102 controls each unit to acquire a live image (through image) used for live view display. Specifically, when power is supplied to each unit and a shutter opens, the sensor unit 103 receives light through the lens 108a and the aperture included in the mechanical mechanism 109, reads out a charge accumulated in each pixel, and outputs the charge as an analog image signal. The A/D conversion unit 104 performs sampling, gain adjustment, A/D conversion, or the like on the analog image signal that was outputted from the sensor unit 103, and outputs the result as a digital image signal. Further, the image processing unit 105 performs various image processing on the digital image signal that was outputted from the A/D converter 104, and outputs image data. Note that in AF processing and AE processing described later, processing is performed using image data at this point to acquire optimum focus and exposure setting conditions for shooting of subsequent live images.

Figure 4A:
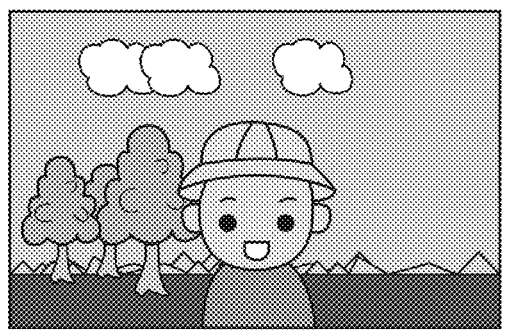
FIGS. 4A to 4D show an example of face region detection processing according to the present embodiment.
Figure 4B:
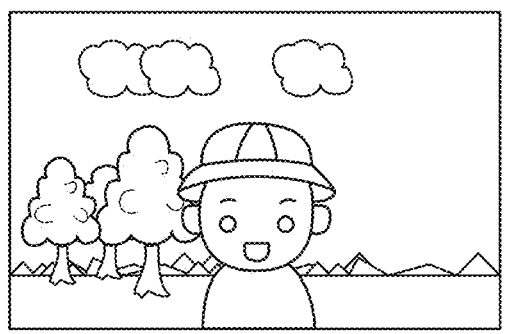
Figure 4C:
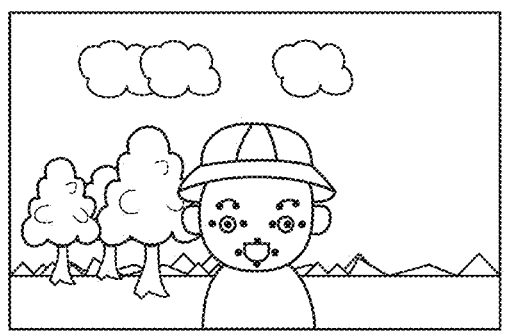
Figure 4D:
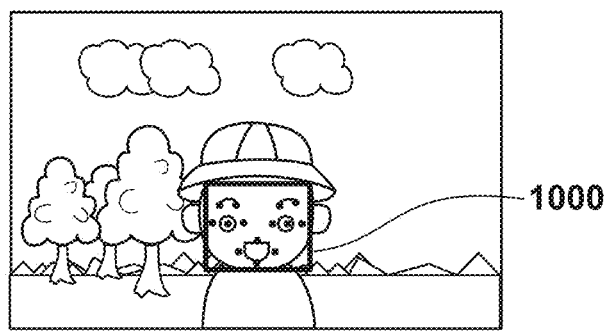

In step S203, the control unit 102 determines whether a face has been detected as object information from the obtained live image. Specifically, the object detection unit 116 performs face detection based on the obtained live image in response to an instruction from the control unit 102, and detects the position, size, and (if necessary) expression of the face. For example, with respect to an image as shown in FIG. 4A, the object detection unit 116 first detects an edge of a luminance signal within the image (FIG. 4B). Then, feature points of a face of a person such as a gradient of a cheek and edge patterns of the eyes, nose, and mouth are extracted (FIG. 4C), and a region including these feature points is set as a face region 1000 (FIG. 4D). Regarding facial expressions, when performing analysis based on feature point positions of the eyes, mouth, and cheeks, for example, when an end point of a mouth corner has moved further upward in the face than a standard case where the end point of the mouth corner indicates a predetermined serious face, this expression is determined to be a smile. When determined that a face has not been detected, the control unit 102 advances processing to step S204, and when determined that a face has been detected, the control unit 102 generates face information indicating the position and the size of the detected face and then advances processing to step S206.

Figure 5A:
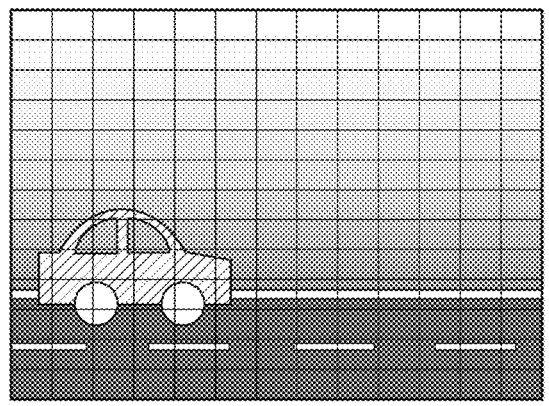
FIGS. 5A to 5C illustrate an example of processing using region division and a histogram according to the present embodiment.
Figure 5B:
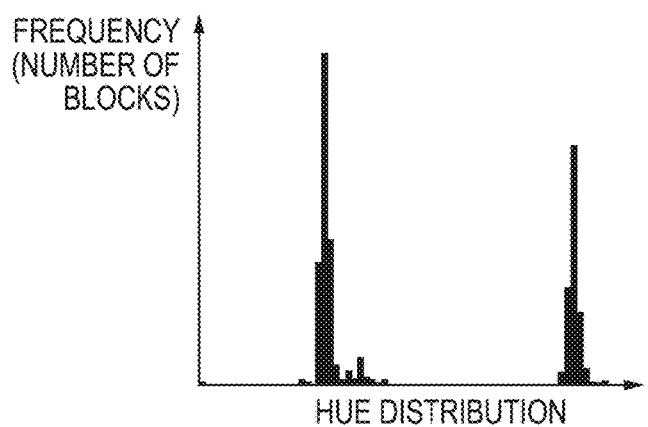
Figure 5C:
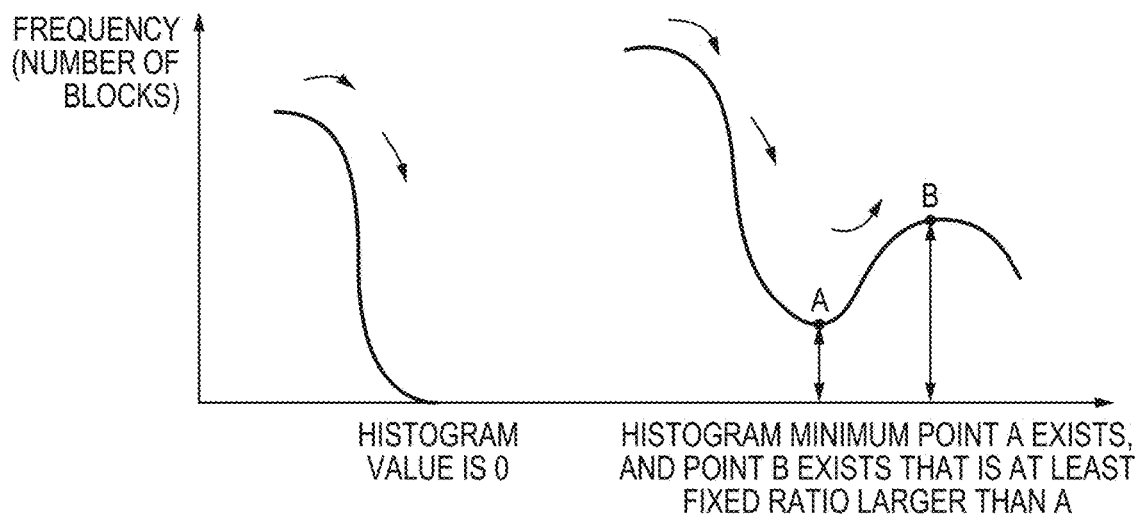

In step S204, the object detection unit 116 divides regions in the image into blocks in response to an instruction of the control unit 102. That is, because a face was not detected in the image, the object detection unit 116 divides regions in the image in order to detect a main object other than a person. First, as shown in FIG. 5A, the object detection unit 116 acquires the hue, saturation, and luminance of each block. Next, a hue histogram as shown in FIG. 5B is created from the hue information of the image divided into blocks. Then, the object detection unit 116 performs grouping of the hues based on the hue histogram. For example, centering on the position with the largest value of histogram, colors in a range up to the point where the histogram reaches a valley are regarded as the same group. FIG. 5C shows an example of grouping based on the relationship between peaks and valleys of the histogram. For example, as shown on the left side of FIG. 5C, a case where the histogram value becomes 0 is taken as a valley. Also, as shown on the right side of FIG. 5C, with respect to a direction from a peak to a valley, when a point B exists that is a fixed ratio larger than a minimum point A of the histogram, the minimum point A is taken as a valley. This sort of processing is repeated with respect to all hues to group them and assign group numbers to the hues. It should be noted that the method of object detection is not limited to the above method, and a configuration may also be adopted in which a face, a person, or another main object included in image data is detected using a well known detection method.

In step S205, the object detection unit 116 determines the main object. First, the object detection unit 116 reads a plurality of divided blocks within the screen line-by-line from the upper left end, and determines blocks belonging to the same region based on the group number allocated by grouping in step S204. For example, when adjacent blocks belong to the same group, the object detection unit 116 determines that the adjacent blocks are in the same region. FIGS. 6A to 6F show an example of determination of blocks belonging to the same region. With respect to blocks that were assigned a group number in step S204 (FIG. 6A), the object detection unit 116 determines group numbers from the upper left (0th row, 0th column) block. If the current determination target block and an adjacent scanned block are in the same group, it is determined that the target block is in the same region as the scanned block (FIG. 6B), and if the current determination target block is in a new group, the region is distinguished (FIG. 6C). The object detection unit 116 subsequently continues scanning while performing similar processing (FIGS. 6D to 6E), and performs grouping with respect to all of the blocks within the screen (FIG. 6F). Note that in the present embodiment, an example of region division according to hue has been described, but another method may also be used as long as it is possible to determine object regions within the screen, and region division according to luminance or saturation may also be used.

Figure 7A:
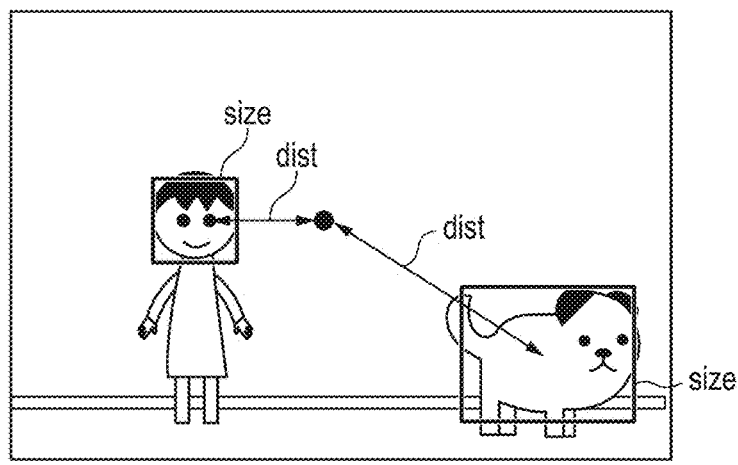
FIGS. 7A to 7C illustrate an example of a method of calculating object evaluation values according to the present embodiment.
Figure 7B:
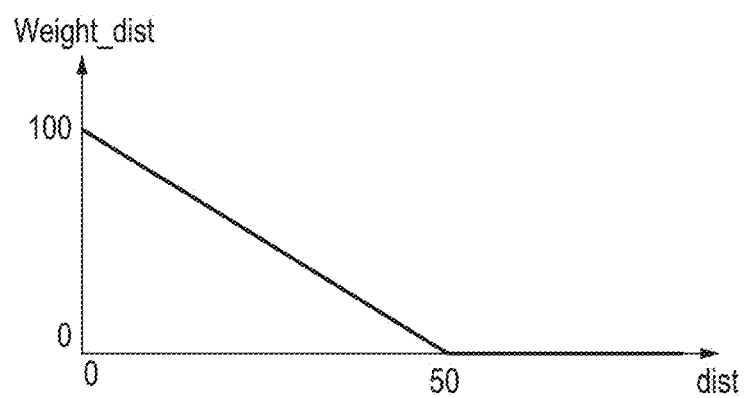
Figure 7C:
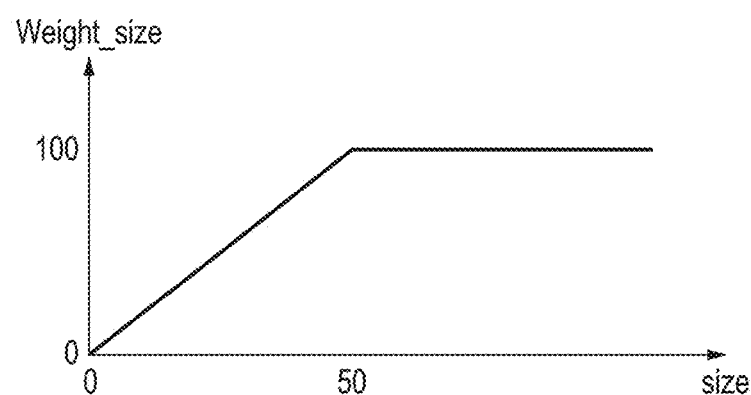

Next, the object detection unit 116 calculates an object evaluation value for each region that was determined to be in the same region. For example, in the present embodiment, an object evaluation value is calculated based on the size ('size') of each region and the distance ('dist') from the center of the screen, as an index representing the possibility of being the main object (FIG. 7A). In this example, 'Weight_dist' decreases as the distance from the center of the screen to the object center of gravity increases (FIG. 7B), and a parameter is calculated such that 'Weight_Size' increases to a predetermined value according to the size of object (FIG. 7C). By multiplying these values, an evaluation value Sn (n=1, 2, . . . ) of each region is calculated, and the region having the highest value of Sn is detected as the main object. The obtained main object region information is transmitted to the AE processing unit 109 and the AF processing unit 108 via the control unit 102. Note that in the present embodiment, if a face was detected in step S203, the processing in steps S204 and S205 is not performed and so the processing load is reduced. However, if a face was detected, as shown in FIG. 7A for example, calculation of the object evaluation values may include a face region.

In step S206, the AF processing unit 108 performs distance measurement processing based on the obtained live image, and acquires an appropriate focus on the main object that was calculated by the object detection unit 116 (AF processing). With the distance measurement processing, it is possible to shift a focus lens (not shown) included in the lens 108a to detect an optimal focus position for the object region, and calculate object distance information from the information of that focus position.

In step S207, the AE processing unit 109 performs photometric processing based on the obtained live image and acquires brightness information appropriate for the region of the main object that was calculated by the object detection unit 116 (AE processing). In the photometric processing, the screen is divided into a plurality of blocks, and an average luminance (photometric value) of the screen is calculated using a block integral value obtained by integrating the luminance values within each block. Also, a deviation ΔBv from the obtained photometric value and the target luminance is calculated, and a value obtained by adding this ΔBv to the photometric value is used as an external light luminance Bv when performing the present shooting. Then, based on the external light luminance ΔBv that was calculated, an exposure value of the present shooting is calculated. That is, an appropriate exposure is maintained by this AE processing. Note that a configuration may also be adopted in which the photometric value is calculated by increasing the degree of weighting of regions of the main object, and the photometric value after that calculation is compared to a default target luminance to obtain the external light luminance Bv.

In step S208, the control unit 102 determines whether to start shooting. For example, when the shutter switch included in the operation unit 101 has been pressed, the control unit 102 advances processing to step S209 and causes the scene discrimination unit 118 to start scene discrimination processing. As described from step S209 onward, the scene discrimination processing is processing to distinguish between scenes of, for example, "daytime", "night scene", "starry sky", "near person", "far person", "macro object movement observation", and "macro stationary object fixed point observation", shown in FIGS. 3A to 3G. These scenes are assigned features (determined) based on the feature amount obtainable from the image data, as described below. Then, the shooting interval setting unit 119 sets a shooting interval for each scene that was distinguished. Object distance information, brightness information (Bv value), object information (face information and main object regions information), and respective region division information that were obtained in the above step are input to the scene discrimination unit 118 as feature amounts. On the other hand, when the shutter switch has not been pressed, the control unit 102 returns processing to step S202 and repeats the processing.

In step S209, the scene discrimination unit 118 determines whether the object distance is far. For example, the scene discrimination unit 118 determines that the object distance is far (that is, including a distant view or infinity) when the object distance information obtained by the AF processing is at least a predetermined distance (for example, 100 meters or more). If the scene discrimination unit 118 determines that the object distance is far, processing is advanced to step S210. On the other hand, if the object distance is less than the predetermined distance, it is determined that the object distance is not far, and processing is advanced to step S215 (in FIG. 2B) to determine whether or not a person is present.

Figure 3A:
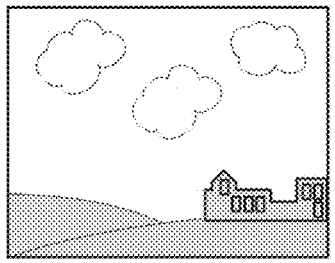
FIGS. 3A to 3G show exemplary scenes subject to a determination according to the present embodiment.

In step S210, the scene discrimination unit 118 determines the brightness of a scene including a distant view. For example, when the brightness information (Bv value) that was obtained by the AE processing is Bv>0, it is determined that the scene being shot is a daytime scene (FIG. 3A). Then, in step S211, the shooting interval setting unit 119 sets shooting interval for a daytime scene to 5 s (seconds). Note that in a daytime scene, the goal is to extract natural fluctuations under sunlight such as the movement of clouds or the sun, so in the present embodiment, the optimum time interval for a natural fluctuation in the distant view is set to 5 s, for example.

Figure 3B:
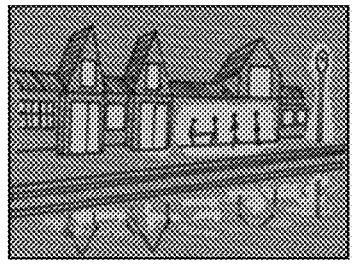

On the other hand, if Bv>0 is not satisfied in step S210, the scene discrimination unit 118 determines whether the brightness information is −5<Bv≤0 in step S212. When the brightness information is −5<Bv≤0, the scene discrimination unit 118 determines that the scene being shot is a night scene (FIG. 3B). Then, in step S213, the shooting interval setting unit 119 sets the shooting interval for a night scene to 15 s. Note that in a night scene there are fewer moving objects within the angle of view than in a daytime scene, and it is also necessary to use a long exposure time in order to track exposure, so in the present embodiment, the optimum time interval is set to 15 s, for example.

Figure 3C:
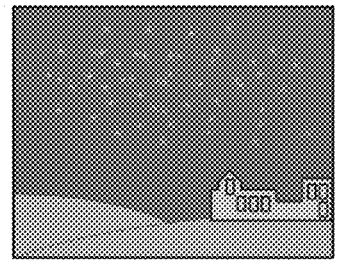

On the other hand, if Bv≤−5 in step S212, the scene discrimination unit 118 determines that the shooting scene is a starry sky scene (FIG. 3C). Then, in step S214, the shooting interval setting unit 119 sets the shooting interval for a starry sky scene to 30 s. In the case of shooting a starry sky, it is desirable to set the exposure time longer than in a night view in order to capture as many stars as possible, so in the present embodiment, the optimum shooting interval is set to 30 s.

Note that in the present embodiment, the object distance is distinguished between a distant view and other views, but this is not a limitation. As the distance to the object increases, changes of the object appear smaller in the screen, so a longer time interval may be set as the object distance increases.

Figure 3D:
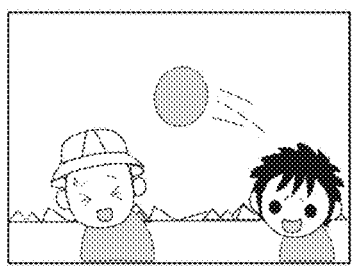

Next is a description of discrimination processing when it has been determined that the scene being shot is not a distant view (that is, the object distance is not far). In step S215, the scene discrimination unit 118 determines whether a person exists in the image using face information, and if a person exists, in step S216 the scene discrimination unit 118 further determines the size of the face region. In the present embodiment, a person scene, such as a scene in which an object that is a relatively large person exists as shown in FIG. 3D, is assumed as a "near person" scene. Therefore, the scene discrimination unit 118 distinguishes whether the scene is a "near person" scene or a "far person" scene according to whether or not the size of the face of the person is ¼ or more of the image width. When the size of the face region is at least the threshold value of the face region (¼ of the image width), the scene discrimination unit 118 determines that the scene being shot is a scene of a near person, and processing is advanced to step S217. On the other hand, when the size of the face region is less than the threshold value of the face region, the scene discrimination unit 118 determines that the scene being shot is a scene of a far person, and processing is advanced to step S218.

Figure 8A:
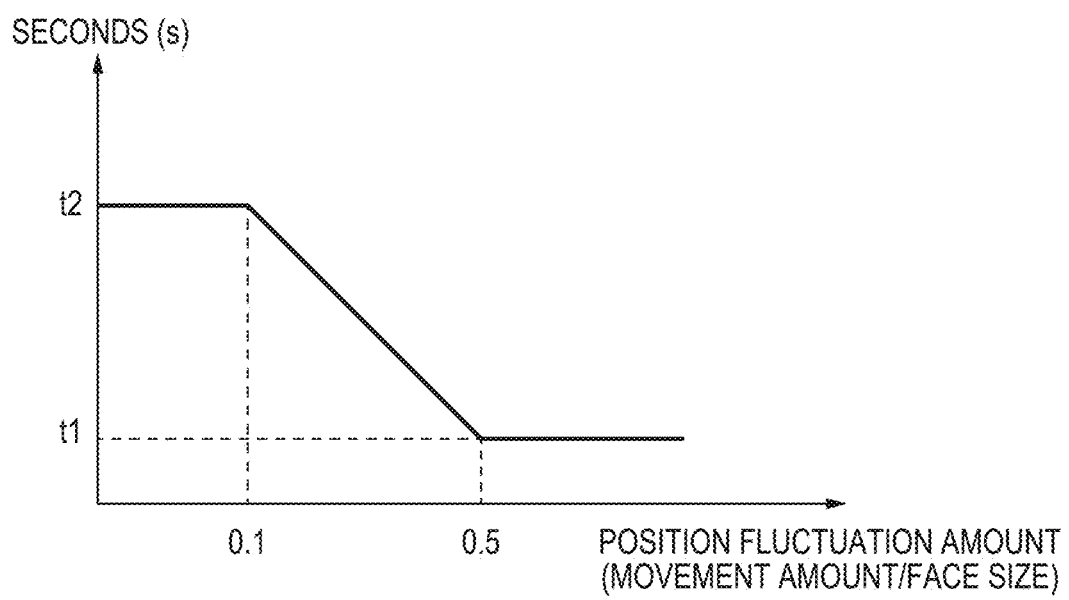
FIGS. 8A and 8B show exemplary shooting intervals for fluctuations of an object according to the present embodiment.
Figure 8B:
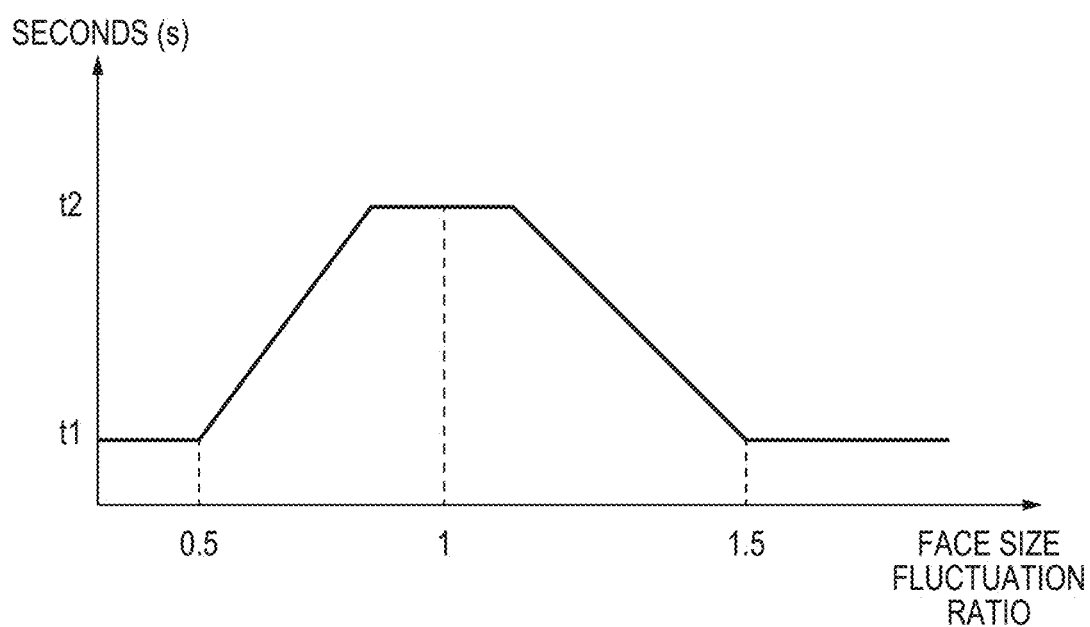

In step S217, the shooting interval setting unit 119 sets the shooting interval according to fluctuations in the position and size of the face. For example, as shown in FIG. 8A, the shooting interval setting unit 119 sets the shooting interval larger as the fluctuation amount of the face position is larger. At this time, the amount of fluctuation of the position of the face is expressed using a ratio of the movement amount of the face to the size of the face, taking into consideration the fact that the movement amount increases as the face becomes closer, for example. Also, as shown in FIG. 8B, the shooting interval is set according to how much the face size has fluctuated from the original size. The determination of the fluctuations in the position and size of the face is performed using a plurality of live images separated by a predetermined time interval through experimentation or the like. For example, if the size of the face is large and the position fluctuation or the size fluctuation is maximum, the shooting interval setting unit 119 sets the shooting interval to a comparatively short 0.5 s. On the other hand, if the position fluctuation and the size fluctuation are small, the shooting interval is set to a comparatively long 1 s.

Figure 3E:
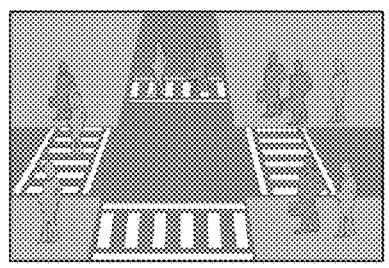

On the other hand, the shooting interval setting unit 119 sets a longer shooting interval for a far person scene than for a near person scene. In the present embodiment, a scene in which human traffic is being shot as shown in FIG. 3E is assumed to be a "far person" scene. Note that in this step as well, as in step S217, the shooting interval is adjusted within 1 to 5 seconds according to the face fluctuation.

Figure 3F:
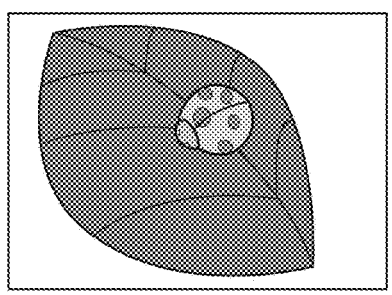
Figure 3G:
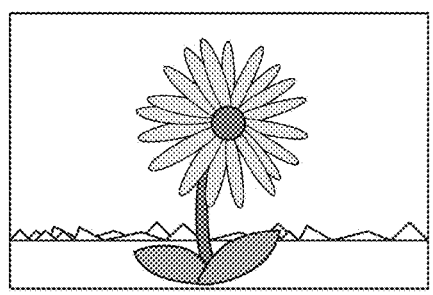

Further, the processing from step S219 onward will be described with respect to a case where the scene being shot is not a distant view and is a scene in which a person does not exist. In the present embodiment, for example, a scene in which a macro object is being shot as shown in FIG. 3F or FIG. 3G is assumed to be such a scene.

Figure 9A:
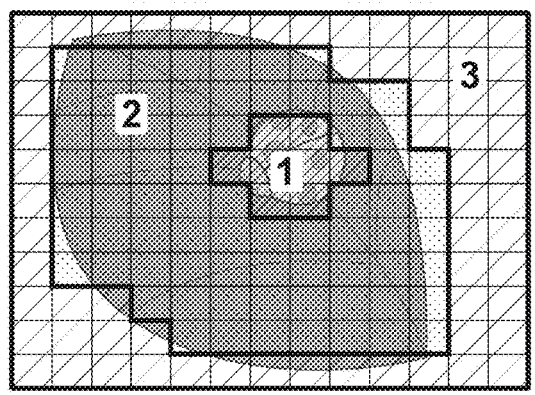
FIGS. 9A and 9B show exemplary object regions for a macro object according to the present embodiment.
Figure 9B:
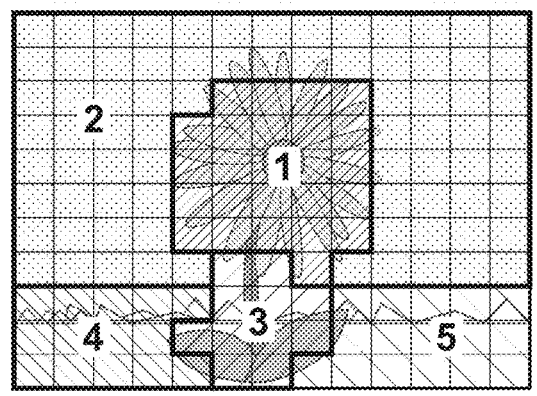
Figure 10A:
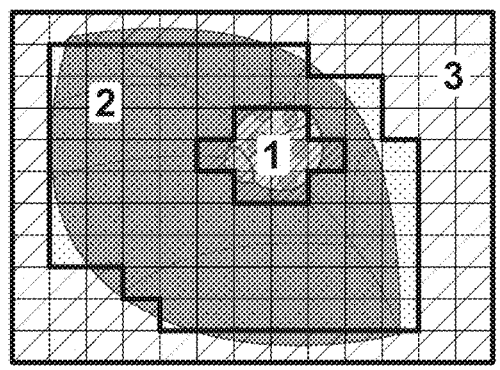
FIGS. 10A and 10B illustrate processing to determine movement of a macro object according to the present embodiment.
Figure 10A:
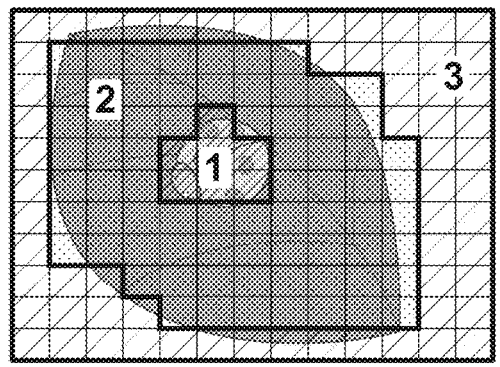
Figure 10A:
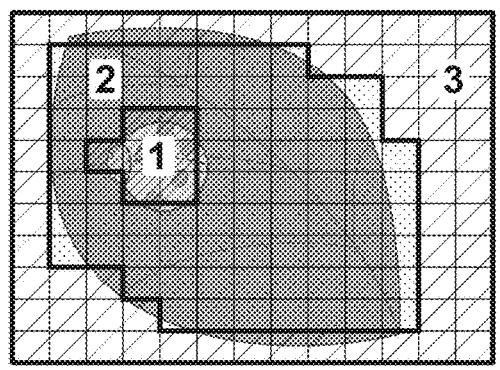
Figure 10B:
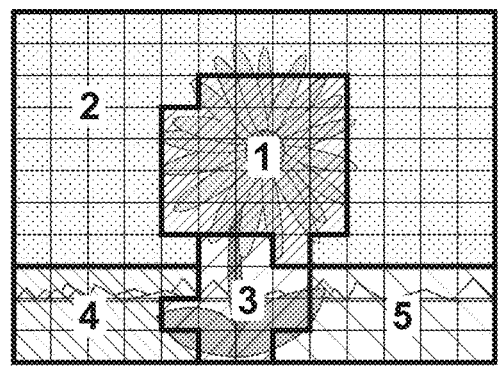
Figure 10B:
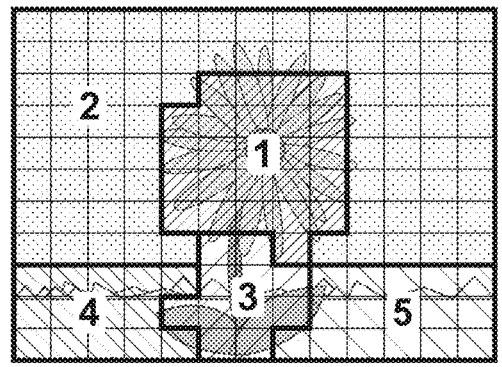
Figure 10B:
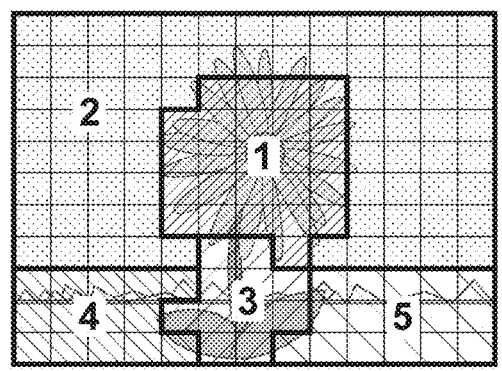

In step S219, the scene discrimination unit 118 tracks the main object in consecutive live images using the main object region information detected according to the above-described region division, and determines the movement amount of the main object. For example, with respect to FIGS. 3F and 3G, it is assumed that the regions are divided as shown in FIGS. 9A and 9B, and as a result of calculating object evaluation values, a priority ranking has been calculated in the order that numbers were assigned to each region. Therefore, in FIGS. 9A and 9B, the region to which the number 1 was assigned represents the main object region. Then, as shown in FIGS. 10A and 10B, detection of the main object region is repeated using consecutive live images, and when the amount of movement of the center of the main object region is at least a predetermined threshold value, it is determined that the scene being shot is a scene of macro object movement observation. In this case, in step S220, the shooting interval setting unit 119 sets the shooting interval to 1 s. On the other hand, in step S219, the scene discrimination unit 118 determines that the scene being shot is a macro stationary object fixed point observation scene when the movement amount is less than the predetermined threshold value. In this case, in step S221, the shooting interval setting unit 119 sets the shooting interval to a somewhat long 10 seconds. In the present embodiment, the amount of movement of the center of the main object region is used as information regarding the movement of the object in the screen corresponding to the image data.

Figure 2A:
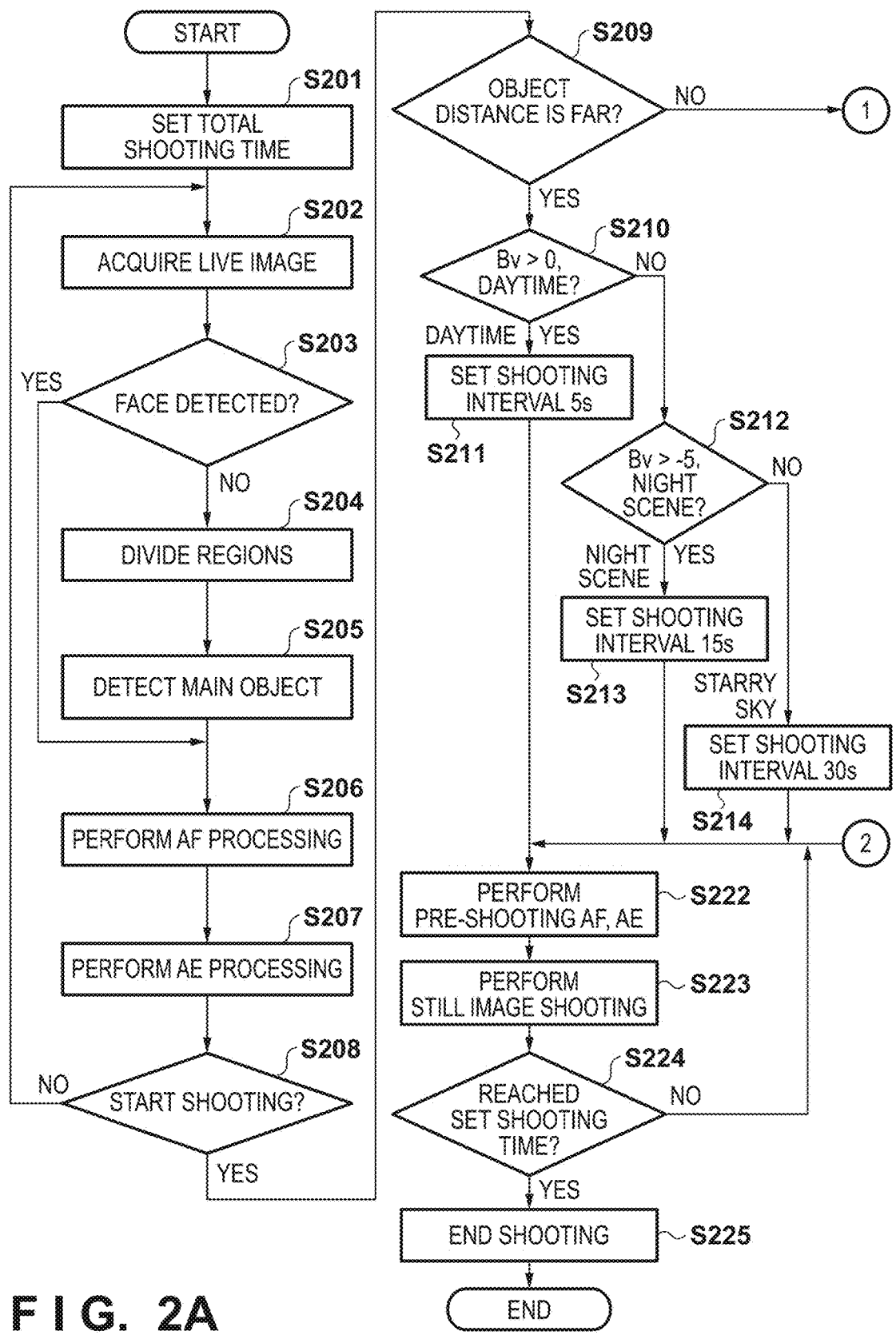
FIGS. 2A and 2B are flowcharts showing a series of operations related to intermittent image capturing according to the present embodiment.
Figure 2B:
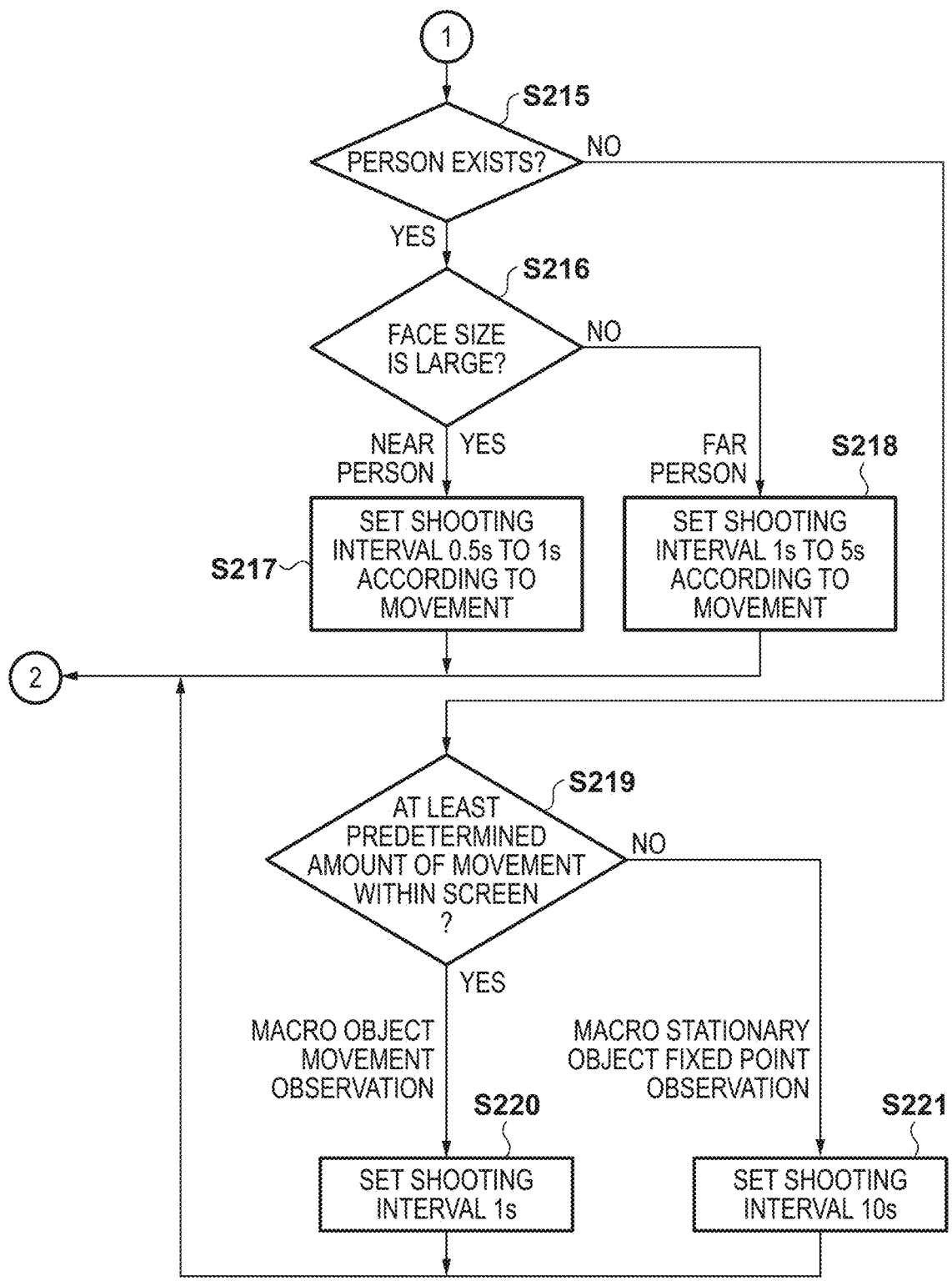

After the shooting interval has been decided by the shooting interval setting unit 119 as described above, the control unit 102 advances processing to step S222 (in FIG. 2A).

In step S222, the control unit 102 transmits the object information at this point to the AE processing unit 109 and the AF processing unit 108, and again causes the AF processing and the AE processing to be performed. Then, based on the object distance information and the brightness information at the present time, shooting (so-called main shooting) of still images is started in step S223. After the control unit 102 shoots still images and records them in the image recording unit 113, the control unit 102 sets the digital camera 100 in a partially dormant state until a set time interval has elapsed. Also, the control unit 102 returns the digital camera 100 from the dormant state after the set time interval has elapsed, with reference to a value of an unshown timer.

In step S224, the control unit 102 determines whether the total shooting time that was set in step S201 has elapsed.

When determined that the total shooting time has not elapsed, processing is returned to step S222 again, and again the AF processing and the like and still image shooting are repeated. By repeating processing in this way, intermittent image capturing is executed. On the other hand, when the control unit 102 has determined that the time has exceeded the total shooting time, the control unit 102 advances processing to step S225 and ends shooting. The plurality of obtained still images are combined as a time lapse moving image by the image processing unit 105, and then converted to a moving image format by the encoder unit 112. The converted moving image format is recorded in a predetermined memory by the image recording unit 113.

Note that in the present embodiment, an example is described in which after discriminating a scene based on information acquired before shooting and deciding a shooting interval, still image shooting is performed according to the decided shooting interval. However, a configuration may also be adopted in which the above-described scene discrimination processing is executed during still image shooting, and the shooting interval is changed according to a change in circumstances. Also, in the above-described embodiment, a case is described in which a time lapse moving image is generated by joining intermittent still images, which were acquired by intermittently performing image capturing of an object, to each other in the order of acquisition, but the method of acquiring image data for the time lapse moving image is not limited to this method. For example, a configuration may also be adopted in which, based on a predetermined image capturing interval that has been decided in advance, image data used to generate a time lapse moving image is extracted from among images corresponding to each frame constituting a moving image, and a time lapse moving image is generated using the extracted image data. Note that when a time lapse moving image is generated by extracting frame images from a moving image in this way, a configuration may be adopted in which the scene discrimination described above is performed for each frame image constituting the moving image, and after acquiring the moving image, image data for the time lapse moving image is extracted such that the image capturing interval corresponds to the scene.

As described above, in the present embodiment, when performing intermittent image capturing at a predetermined time interval, the scene being shot is distinguished based on a feature amount obtained from the image data, and according to the distinguished scene, a predetermined time interval is set. By doing so, in intermittent image capturing, it is possible for the user to set an appropriate time interval according to the scene, such as a starry sky, a landscape, or a flow of people or cars, without manually setting a time interval. That is, in intermittent image capturing, it is possible to facilitate setting of an image capturing interval that is appropriate for the scene.

Also note that in the above-described embodiment, a configuration is described in which a time lapse moving image is generated based on image data that was acquired by performing time lapse shooting separately from live image shooting, but this is not a limitation. For example, a configuration may be adopted in which intermittent image data for a time lapse moving image is set from among acquired live images, based on the image capturing interval that was set by the above-described processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-125916, filed Jun. 24, 2016, which is hereby incorporated by reference herein in its entirety.

What is claimed is:

1. An image capturing apparatus capable of performing an interval shooting for acquiring images corresponding to frames that constitute a time lapse moving image, the image capturing apparatus comprising:
   an image sensor configured to perform intermittent first image capturing at a predetermined time interval when the interval shooting is performed;
   at least one processor; and
   a memory storing instructions which cause the at least one processor to perform operations of following units:
   an acquisition unit configured to acquire a feature amount of image data obtained by second image capturing performed before the first image capturing;
   a determination unit configured to determine a scene based on the feature amount; and
   a setting unit configured to set the predetermined time interval according to the scene determined by the determination unit without receiving manual operation from a user;
   wherein the second image capturing is performed at a different timing from the first image capturing,
   wherein the time lapse moving image is a moving image whose playback time is shorter than image capturing time necessary for the interval shooting, and
   wherein the feature amount is information related to at least one of luminance of the image data, object distance to an object, a detection result of an object, and movement of an object.

2. The apparatus according to claim 1,
wherein the determination unit, in a case where the feature amount includes the object distance, determines the scene based on the feature amount according to the object distance.

3. The apparatus according to claim 1,
wherein the determination unit, in a case where the feature amount includes information of a face region as a detection result of the object, determines the scene based on the feature amount according to existence and size of the face region.

4. The apparatus according to claim 3,
wherein the determination unit, in a case where the feature amount further includes the object distance, performs determination according to existence and size of the face region when the object distance is less than a predetermined distance.

5. The apparatus according to claim 1,
wherein the determination unit, in a case where the feature amount includes a brightness that was obtained from luminance of the image data, determines the scene based on the feature amount according to the brightness.

6. The apparatus according to claim 5,
wherein the determination unit, in a case where the feature amount further includes an object distance to an object, performs determination according to the brightness when the object distance is at least a predetermined distance.

7. The apparatus according to claim 1,
wherein the determination unit, in a case where the feature amount includes movement information of each region obtained by dividing content of a screen as movement of the object, determines the scene based on the feature amount according to the movement information of each region.

8. The apparatus according to claim 1,
wherein the setting unit, in a case where the feature amount includes the object distance, sets the predetermined time interval longer for a scene where the object distance is greater.

9. The apparatus according to claim 1,
wherein the setting unit, in a case where the feature amount includes luminance of the image data, sets the predetermined time interval longer for a scene where a lower brightness was obtained from luminance of the image data.

10. The apparatus according to claim 1,
wherein the setting unit, in a case where the feature amount includes a detection result of the object, and a face region detected as an object exists in the scene, sets the predetermined time interval shorter as the size of the face region increases.

11. The apparatus according to claim 1,
wherein the setting unit, in a case where the feature amount includes a detection result of the object, and a main object region that is not a face region exists in the scene, sets the predetermined time interval shorter as the movement amount of the main object region increases.

12. The apparatus according to claim 1,
wherein the setting unit, in a case where the feature amount includes a detection result of the object, and a detected object region exists in the scene, sets the predetermined time interval shorter as fluctuation of the size of the object region increases.

13. The apparatus according to claim 1, wherein the at least one processor further functions as:
a detection unit configured to, in a case where the feature amount includes a detection result of the object, among regions within a screen having a hue included in a predetermined range, detect an object region as a detection result of the object by determining that regions adjacent to each other belong to the same region.

14. The apparatus according to claim 1, wherein the at least one processor further functions as:
a control unit configured to control the image sensor so as to start the intermittent image capturing after the predetermined time interval has been set by the setting unit.

15. The apparatus according to claim 1, wherein the at least one processor further functions as:
a control unit configured to control the image sensor to set a new predetermined time interval with the setting unit while performing the intermittent image capturing, and perform the intermittent image capturing at the new predetermined time interval.

16. The apparatus according to claim 1, wherein the at least one processor further functions as:
a generation unit capable to generate the time lapse moving image and a normal moving image which is different from the time lapse moving image,
wherein the generation unit generates the time lapse moving image in which a plurality of images obtained by the intermittent image capturing have been joined together in time series, and
wherein the time lapse moving image is a moving image in which an acquisition interval between images corresponding to frames that constitute the moving image is longer than an acquisition interval of the normal moving image.

17. A control method of an image capturing apparatus capable of performing an interval shooting for acquiring images corresponding to frames that constitute a time lapse moving image, the method comprising:
performing intermittent first image capturing, by an image sensor, at a predetermined time interval when the interval shooting is performed;
acquiring a feature amount of image data obtained by second image capturing performed before the first image capturing from the image sensor when the interval shooting is performed;
determining a scene based on the feature amount; and
setting the predetermined time interval according to the scene without receiving manual operation from a user;
wherein the second image capturing is performed at a different timing from the first image capturing,
wherein the time lapse moving image is a moving image whose playback time is shorter than image capturing time necessary for the interval shooting, and
wherein the feature amount is information related to at least one of luminance of the image data, object distance to an object, a detection result of an object, and movement of an object.

18. A non-transitory computer-readable storage medium storing a program for causing a computer to execute a control method of an image capturing apparatus capable of performing an interval shooting for acquiring images corresponding to frames that constitute a time lapse moving image, the method comprising:

performing intermittent first image capturing, by an image sensor, at a predetermined time interval when the interval shooting is performed;
acquiring a feature amount of image data obtained by second image capturing performed before the first image capturing;
determining a scene based on the feature amount; and
setting the predetermined time interval according to the scene without receiving manual operation from a user;
wherein the second image capturing is performed at a different timing from the first image capturing,
wherein the time lapse moving image is a moving image whose playback time is shorter than image capturing time necessary for the interval shooting, and
wherein the feature amount is information related to at least one of luminance of the image data, object distance to an object, a detection result of an object, and movement of an object.

\* \* \* \* \*